Aug. 21, 1928.

N. G. MEYERS 1,681,740

DEVICE FOR COMPUTING UNDERWEAR SIZES

Filed April 22, 1926

INVENTOR
NORMAN G. MEYERS
BY
ATTORNEYS

Patented Aug. 21, 1928.

1,681,740

UNITED STATES PATENT OFFICE.

NORMAN G. MEYERS, OF NEW YORK, N. Y., ASSIGNOR TO THE B. V. D. COMPANY, INC., OF NEW YORK, N. Y., A CORPORATION OF NEW YORK.

DEVICE FOR COMPUTING UNDERWEAR SIZES.

Application filed April 22, 1926. Serial No. 103,743.

The invention relates to underwear and more particularly to that class of undergarments which are commonly referred to as union suits and in which it is desirable, in order to secure a maximum of comfort, to provide a proper fitting garment for each individual. Under existing conditions, it is necessary, in order to ascertain the proper size required in a union suit, to take at least three measurements, namely, chest, waist and trunk measurements. The chest measurement is taken by running the tape measure under the arm-pits and around the body at the widest part of the chest, while the waist measurement is taken by passing the tape around the waist at the narrowest portion thereof; the trunk measurement is obtained by running the tape measure from that part of one shoulder nearest the neck through the crotch and then back to the point at which the measurement starts. After the results of these measurements have been noted, it is necessary for the salesman to determine the proper size of undergarment which is required. Obviously, the success of the fitting depends, in such case, entirely upon the individual skill of the particular salesman in translating the aforesaid measurements into undergarment sizes, and in many cases, produces unsatisfactory results. The object of the present invention is to provide a computing device whereby the proper size required in the undergarment may be easily and positively ascertained as soon as the results of the measurements referred to above are known. Other more specific objects will appear from the description hereinafter, and the features of novelty will be pointed out in the claims.

Figure 1:
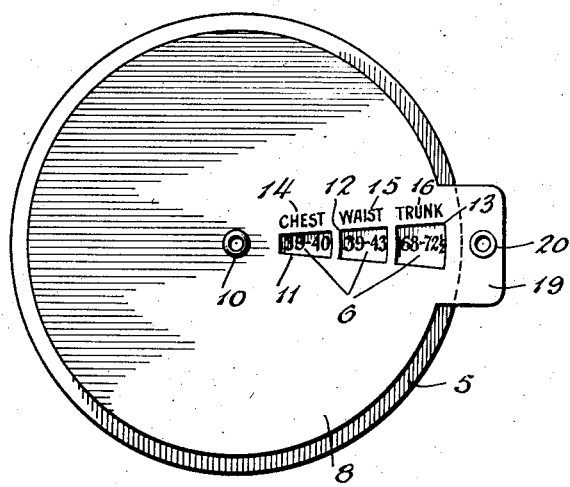
Figure 2:
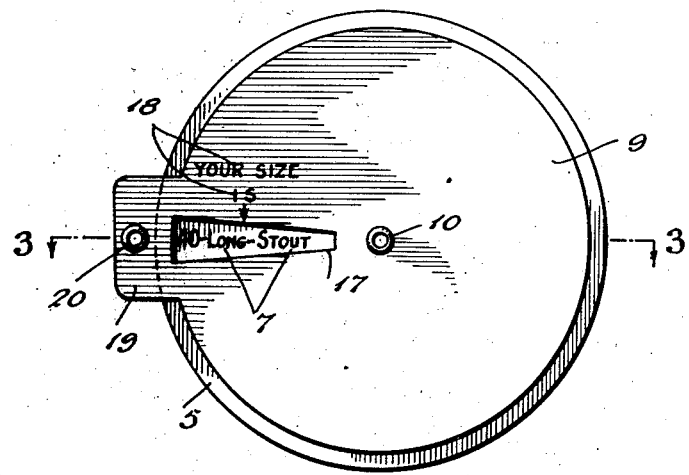
Figure 3:
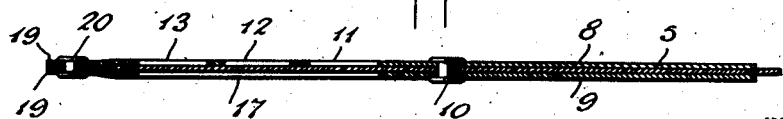

In the accompanying drawing which illustrates an example of the invention without defining its limits, Fig. 1 is a face view of the computing device; Fig. 2 is a similar view of the opposite face thereof, and Fig. 3 is a sectional view on the line 3—3 of Fig. 2.

The device comprises essentially an element provided with a table of measurements and a table of underwear sizes related thereto in combination with a computing device movable relatively to said member and constructed and arranged to selectively expose to view an item of said table of measurements and to coincidentally expose to view the corelated size item in the table of sizes.

In the illustrated example, the computing device consists of a main member 5 upon the one face of which a table 6 is produced in any suitable way and comprising items indicating chest, waist and trunk measurements in different combinations which, experience has shown, are more less related to each other. Upon its opposite face, the main member 5 is provided with a table of underwear sizes 7, the items of which are corelated to the items of the table of sizes 6. The aforesaid main member 5, as shown in the drawing, is preferably in the form of a disc upon the opposite surface of which the tables 6 and 7 are produced so that the items of said tables are located along lines extending radially outward from the center of the disc. The computing device whereby the individual items of said tables are exposed in coincidental relation, comprises outer discs 8 and 9 located respectively in surface engagement with the opposite surfaces of the main or intermediate disc 5 and rotatably connected therewith by means of a rivet or other suitable pivot 10. The disc 8 is apertured in a manner to separately expose items of the table 6, for instance, by being provided with diagonally aligned openings 11, 12 and 13 which may be appropriately designated for instance by means of titles 14, 15 and 16, which in the illustrated example read respectively "chest", "waist", and "trunks"; these titles designate the parts of the human anatomy to which the groups of figures in each item of the table 6 relate. Similarly, the disc 9 may be apertured to individually expose items of the table 7 by being provided with a diagonally disposed continuous slot 17 bearing an appropriate phrase 18 which, as indicated, may read "Your size is". The relative movement between the main member and the computing device or in the specific form illustrated between the main or intermediate disc 5 and the auxiliary or outer discs 8 and 9, may be accomplished in any suitable manner. For instance, as shown in the drawings, the discs 8 and 9 may each be provided with extensions 19 projecting outwardly from the peripheries of the discs 8 and 9 beyond the periphery of the disc 5 and connected with each other by means of a rivet or other fastening device 20. When constructed in the form shown in the drawing, the diameter of the main or intermediate disc 5 is preferably somewhat larger than the diameters of the outer discs 8 and 9 so that the periphery of the main disc 5 is accessibly located beyond the peripheries of the discs 8 and 9.

In utilizing the device relative rotation of the discs is brought about for instance by grasping the connected extensions 19 between the fingers of one hand and rotating the disc 5 by contact with its periphery with the other hand or by holding the periphery of the main disc 5 in the fingers of one hand and rotating the outer discs 8 and 9 through the medium of the connected extensions 19 with the other hand; in either case the result will be to rotate the disc 5 relatively to the connected discs 8 and 9 and to bring the selected group of fingers constituting an item of the table 6 into line with the apertures 11, 12 and 13 which operation automatically and coincidentally exposes the proper and related size item in the table of sizes 7 upon the opposite face of the device through the slot 17. In this way the correct and proper fit in the particular undergarment is invariably provided. For instance, if the man being measured should measure forty inches in the chest, forty-three inches in the waist, and seventy inches in the trunk, the computing device would be actuated to bring into view through the apertures 11, 12 and 13 that group of figures in the table 6 which includes or comes nearest to the indicated measurements. It will be noted that each group of figures in each item of the table 6 indicates varying ranges of measurements; under the conditions indicated above, the actuation of the device in the indicated manner would bring to view that item in the table 6 which reads as follows: "39—40" under the designation "Chest", "39—43" under the designation "Waist", and "68—72½" under the designation "Trunk". Reversing the device, it will be found that this adjustment has brought an item in the table 7 to view through the aperture 17; in the present instance that item reads "40 long stout", indicating that the most appropriate size for the indicated measurements is a garment known as "40 long stout". As the tables 6 and 7 represent data obtained as the result of continued and long experience, it will be obvious that the most comfortable and best fitting sizes for given individuals may be quickly obtained by simply obtaining the measurements of the persons in question and then operating the computing device in the manner described. It will be obvious that the main member as exampified by the dics 5, and the computing device as exampified by the discs 8 and 9, may be constructed and operated in other ways than illustrated without in any way interfering with the efficiency and accuracy of the device.

Various changes in the specific form shown and described may be made within the scope of the claims without departing from the spirit of my invention.

I claim:

1. A devise for computing underwear sizes comprising a main member provided upon one face with a table of measurements arranged in related groups and upon its opposite face with a table of underwear sizes related to each group of measurements and a device connected with said member and covering the opposite surfaces thereof, said device being movable relatively to said member and being provided with apertures located upon a common radius upon opposite surfaces of said device to expose to view on one face one group of said table of measurements and to coincidentally expose to view on the opposite face the corelated size item in the table of sizes.

2. A device for computing underwear sizes comprising an intermediate disc provided upon one face with a table of measurements arranged in related groups and upon its opposite face with a table of underwear sizes related to each group of measurements, outer discs rotatably connected with said intermediate disc in surface engagement with the opposite faces thereof, said outer discs being provided respectively with a single aperture and with a plurality of adjacent apertures adapted to expose individual groups of items of said tables, and extensions projecting radially outward from said outer discs and secured together beyond the periphery of the intermediate disc for connecting said outer discs to facilitate rotating the same in unison relatively to said intermediate disc to expose to view on one face one group of said table of measurements and to coincidentally expose to view on the opposite face the corelated size item in the table of sizes.

In testimony whereof I have hereunto set my hand.

NORMAN G. MEYERS.